United States Patent [19]

Schmidt

[11] Patent Number: 4,960,250

[45] Date of Patent: Oct. 2, 1990

[54] ENERGY DESATURATION OF ELECTROMECHANICAL ACTUATORS USED IN SATELLITE ATTITUDE CONTROL

[75] Inventor: Donald J. Schmidt, Ellicott City, Md.

[73] Assignee: Space Industries Partnership, L.P., Webster, Tex.

[21] Appl. No.: 242,984

[22] Filed: Sep. 12, 1988

[51] Int. Cl.$^5$ .............................................. B64G 1/24
[52] U.S. Cl. ..................................... 244/164; 244/165
[58] Field of Search ................... 244/158 R, 164, 165, 244/166, 167, 169, 171; 364/459, 434

[56] References Cited

U.S. PATENT DOCUMENTS

| | | | |
|---|---|---|---|
| 3,493,194 | 2/1970 | Kurzhals | 244/165 |
| 3,813,067 | 5/1974 | Mork | 244/165 |
| 3,998,409 | 12/1976 | Pistiner | 244/165 |
| 4,010,921 | 3/1977 | Pistiner et al. | 244/165 |
| 4,230,294 | 10/1980 | Pistiner | 244/165 |
| 4,728,061 | 3/1988 | Johnson et al. | 244/164 |

OTHER PUBLICATIONS

NASA Technical Memorandum X-53748, "Angular Momentum Desaturation for ATM Cluster Configuration Using Gravity Gradient Torques", Hans F. Kennel, Marshal Space Flight Center, Alabama, 1970.

Primary Examiner—Galen Barefoot
Attorney, Agent, or Firm—Venable, Baetjer and Howard

[57] ABSTRACT

In an attitude control system for a spacecraft having a frame which is to be maintained in a desired orientation relative to a selected set of reference axes, which system includes an electromechanical actuator mechanically coupled to the spacecraft frame for applying to the frame a mechanical torque which opposes deviations from the desired orientation relative to at least one reference coordinate, the actuator including an electric motor and an element connected to be rotated by the motor, and a torque command signal generator connected to the motor for applying a torque command signal which is a function of such deviations and which drives the motor in a manner to control the torque being produced by the actuator, there is included an energy desaturating system composed of: a unit coupled to the element for producing a signal representative of element motion; a signal modifying circuit connected to produce a control signal having a magnitude which is a function of the signal representative of element motion; and signal coupling components including a switch connected for applying the control signal to the actuator with a polarity for effecting actuator desaturation only during the times that the switch is closed.

15 Claims, 3 Drawing Sheets

ENERGY DESATURATION OF ELECTROMECHANICAL ACTUATORS USED IN SATELLITE ATTITUDE CONTROL

BACKGROUND OF THE INVENTION

The present invention relates to attitude control systems employed in space vehicles.

Space vehicles are generally provided with attitude control systems for maintaining the vehicle in a desired attitude with respect to some set of reference axes which do not rotate with the vehicle. In most cases, the reference axes either are aligned with the vehicle orbit or fixed with respect to the sun or stars.

Conventional attitude control systems contain a plurality of channels, there generally being one channel associated with each vehicle body axis, and each channel may contain an electromechanical actuator which can be in the form of a reaction wheel assembly, a momentum wheel assembly, or a control moment gyro assembly. Each type of assembly includes a wheel which is rotated at high speed to produce a force tending to oppose disturbance forces acting on the vehicle.

During prolonged operation, such actuators tend to become saturated with unwanted disturbance energy.

In the case of reaction wheel assemblies, saturation occurs when the wheel drive motor reaches its limit speed.

Momentum wheel assemblies become saturated when the momentum wheel and the space vehicle precess together under the influence of a disturbance torque until the resulting angular displacement of the vehicle from a desired orientation becomes unacceptably large, or until the speed of rotation of the momentum wheel deviates from the desired, fixed speed by a predetermined amount.

In the case of control moment gyros, saturation occurs when the wheel gimbal displacement becomes such that required control torque outputs can no longer be generated, or the gimbals reach the mechanical stops that limit their pivoting movement. Such gyro devices can have either one or two degrees of freedom. When the device has two degrees of freedom, the actuator includes two gimbal pivoting motors and two loops, or channels, each associated with a respective degree of freedom.

To desaturate a reaction wheel assembly, the usual practice is to apply a voltage to the associated drive motor amplifier in a manner to reduce the speed of the reaction wheel. In the case of a momentum wheel assembly, a voltage is applied to the momentum wheel drive motor amplifier in order to return the momentum wheel speed to its nominal value. Moreover, torque is applied to the vehicle by means other than the momentum wheel assembly in order to return the vehicle and the momentum wheel to the desired attitude. For a control moment gyro assembly, desaturation is effected by acting on the or each gimbal motor to drive the associated gimbal toward its null position.

Whenever desaturation is being effected by applying voltage to a drive motor amplifier, the result is to impose a disturbance torque on the space vehicle. Therefore, it is usually necessary to provide an additional source of stabilizing torque on the vehicle, at least during the desaturation phase.

Such an additional stabilizing source may be of the passive type, such as gravity gradient booms or aerodynamic fins, or active devices not of the electromechanical variety, such as gas jet thrusters or magnetic torque rods.

It is the general practice in the art to effect momentum management, or energy desaturation, by deriving signals representative of wheel motion. In the case of a reaction wheel, only a signal representative of wheel speed is needed. If the actuator employs a momentum wheel, multiple signals are needed: signals representative of the angular attitude of the satellite; and a signal representative of wheel speed. If the actuator employs a control moment gyro, the signal is representative of the angular position of a respective gimbal. The wheel motion signal is applied to a computer in which a complicated algorithm is implemented to produce a torque command voltage that will drive the wheel, or the gimbal, in the manner required to achieve desaturation.

All facets of space vehicle attitude control are described in a text edited by James R. Wertz, *Spacecraft Attitude Determination and Control*, D. Reidel Publishing Company, Dordrecht, Holland, 1978.

Various types of attitude control systems are described in the following publications:

V. N. Branets, et al., *Development Experience of the Attitude Control System Using Control Moment Gyros for Long-Term Orbiting Space Stations*, 38th Congress of The International Astronautical Federation, Brighton, United Kingdom, Oct. 10-17, 1987, pp 1-8;

H. F. Kennel, *Steering Law for Parallel Mounted Double-Gimbaled Control Moment Gyros—Revision A*, NASA Technical Memorandum, TM-82390, January 1981, available from NTIS.

Other publications describing attitude control system and energy desaturation, or momentum management, techniques are:

Bendix Research Laboratories, Southfield, Mich., Technical Report BRL/TR-73-6768, CMG/TACS Control System Hybrid Simulation, September 1973;

John R. Glaese, et al., *Torque Equilibrium Attitude Control for Skylab Reentry*, NASA TM-78252, November 1979, available from NTIS;

Robert O. Hughes, *Conceptual Design of Pointing Control Systems for Space Station Gimballed Payloads*, presented as Paper 86-1986 at the AIAA Guidance, Navigation, and Control Conference, Williamsburg, Va. Aug. 18-20, 1986, pp 78-87;

Henry H. Woo, et al., *Momentum Management Concepts for a Space Station*, presented as Paper 86-2047 at the AIAA Guidance, Navigation, and Control Conference, Williamsburg, Va., Aug. 18-20, 1986, pp 277-286; a revised version was published in J. Guidance, Vol. 11, No. 1, January—February 1988, AIAA, pp 19-25; and Henry N. Woo, et al., *Preliminary Evaluation of a Reaction Control System for a Space Station*, presented as Paper 86-2152 at the AIAA Guidance, Navigation, and Control Conference, Williamsburg, Va., Aug. 18-20, 1986, pp 538-546.

The use of gravity gradient booms for spacecraft stabilization is described in the following publications:

D. K. Anand, et al., *Attitude Performance of Some Passively Stabilized Satellites*, Journal of the British Interplanetary Society, Vol. 26, 1973, pp 641-661;

David L. Blanchard, *Flight Results from the Gravity-Gradient-Controlled RAD-1 Satellite*, presented as Paper 86-2140 at the AIAA Guidance, Navigation, and Control Conference, Williamsburg, Va., Aug. 18-20, 1986, pp 479-487; and R. V. Davis, et al., *Flight Experience and Application of Earth-Orbiting Gravity Gradient Stabilization Systems.* (Proceedings of the Sixteenth International Astronautical Congress, Anthens, Greece, International Astronautical Federation, Vol. II, 1966), pp 293-300 and four pages of Figures.

FIG. 1 illustrates one known type of attitude control system in which spacecraft attitude is maintained by at least one auxiliary passive torque source during actuator desaturation. In the drawing, mechanical couplings are illustrated by solid lines and electrical couplings by broken lines, and one attitude control channel is illustrated. Spacecraft frame 2 is mechanically coupled to an electromechanical actuator 4 and an auxiliary passive torque source 6. In normal operation, actuator 4 will apply a torque tending to oppose deviations in the attitude of frame 2 from its desired orientation relative to at least one reference coordinate, or axis. This is indicated by the negative sign in the line coupling actuator 4 to frame 2. Thus, in normal operation, actuator 4 tends to stabilize frame 2.

Auxiliary passive torque source 6 may, depending on the manner in which the satellite attitude is to be controlled, apply either a stabilizing or destabilizing torque to frame 2 during various orbital phases.

The true attitude angle and true angle rate of spacecraft frame 2 are sensed by angle motion sensors 8 which produce output signals indicative of those parameters. Those signals are applied to a computer 10 which derives, on the basis of those values, for a given attitude control channel, a torque command voltage which is applied to a power amplifier 14 in actuator 4. The output voltage produced by amplifier 14 is supplied to an electric motor 16 to cause that motor to generate a torque which acts in a direction to return frame 2 to the desired attitude about the coordinate axis associated with the attitude control channel.

The rotor of motor 16 is coupled to a momentum storage element 18 which rotates together therewith. The motion of element 18 is indicative of the disturbance energy stored therein and is sensed by a sensor 20 which supplies a signal indicative of measured motion to computer 10.

If actuator 4 is a reaction wheel assembly or a momentum wheel assembly, element 18 is the wheel, which is driven by motor 16, and sensor 20 produces a signal representative of the direction and speed of wheel rotation. If actuator 4 is a control moment gyro assembly, element 18 is a pivotally mounted gimbal supporting the gyro rotor and pivoted by motor 16, and sensor 20 produces a signal representative of the direction and magnitude of the angular deviation of the gimbal from its null position.

Computer 10 processes the information provided by the measured motion signal according to a relatively complicated algorithm in order to apply to power amplifier 14 a signal which drives motor 16 in a manner to dissipate the disturbance energy stored in element 18.

A system of the type illustrated in FIG. 1 would be employed, for example, in an earth-oriented satellite, where the gradient of the earth's gravity is the available source of auxiliary passive restoring torque with respect to the pitch and roll attitude control channels, while the inertial reaction of the spacecraft frame to the rotation of the satellite around the earth is the available source of auxiliary passive restoring torque in the yaw channel.

In the case of a satellite which is orbiting the earth but which is oriented in a reference frame fixed in inertial space, for example a sun-oriented or star-oriented satellite, the earth's gravity gradient is the available source of auxiliary passive restoring torque for all attitude control channels. However, in this case, the ability of the auxiliary passive source of restoring torque to impose a stabilizing influence on the spacecraft frame is intermittent since, as the satellite orbits the earth, the gravity gradient will alternately generate restoring torque and disturbance torque. In this case, electromechanical actuator desaturation must be interrupted during the time periods when the gravity gradient is generating a disturbance torque because actuator desaturation at those times would destabilize the satellite attitude.

FIG. 2 illustrates a second known type of attitude control system which is identical to that shown in FIG. 1 except for the type of auxiliary actuators employed. In the case of the arrangement shown in FIG. 2, the auxiliary actuators 22 are not passive torque sources, but instead are actuators of the active type, such as gas jet thrusters or magnetic torque rods. These actuators 22 would be controlled by appropriate signals from computer 10. In the arrangement shown in FIG. 2, desaturation of the electromechanical actuators 4 would be effected in the same manner as described above in connection with FIG. 1.

The desaturation techniques described above have a number of disadvantages which are connected with the fact that they must be controlled by a digital computer operating according to a relatively complicated algorithm. Specifically, development, testing and correction of the algorithm is a relatively time consuming, and hence expensive, procedure, particularly since they must allow for programmed attitude maneuvers and must take account of the fact that the angle rates at which spacecraft rotate around their own centers of mass, in response to torques generated by the actuators, are finite. Moreover, when a new spacecraft is being developed, its performance parameters in space can only be estimated. Once the spacecraft has been placed into orbit, adjustments to the algorithm employed to control desaturation, due to differences between estimated and actual performance, are difficult, if not impossible, to effectuate.

Furthermore, the existing techniques raise the possibility of overshoot in the torque commands to the electric motors driving the momentum storage elements in the actuators which are being desaturated, resulting in unwanted energy being put back into the elements.

SUMMARY OF THE INVENTION

It is an object of the present invention to effect actuator desaturation in a manner which eliminates, or at least substantially reduces, the above-described drawbacks of known techniques.

Another object of the invention is to control actuator desaturation by a simple feedback path which does not require a complicated algorithm for its operation.

A further object of the invention to effect actuator desaturation with a circuit arrangement which can be readily adjusted after the spacecraft has been placed into orbit.

The above and other objects are achieved, according to the invention, in an attitude control system for a spacecraft having a frame which is to be maintained in a desired orientation relative to a selected set of reference axes, which system includes an electromechanical actuator mechanically coupled to the spacecraft frame for applying to the frame a mechanical torque which opposes deviations from the desired orientation relative to at least one reference coordinate, the actuator including an electric motor and an element connected to be rotated by the motor, and torque command signal generating means connected to the motor for applying a torque command signal which is a function of such deviations and which drives the motor in a manner to control the torque being produced by the actuator, by the provision of energy desaturating means comprising: means coupled to the element for producing a signal representative of element motion; signal modifying means connected to produce a control signal having a magnitude which is a function of the signal representative of element motion; and signal coupling means including a switch connected for applying the control signal to the actuator with a polarity for effecting actuator desaturation only during the times that the switch is closed.

The advantages of the present invention result essentially from the use of means connected to produce a motor control signal having a magnitude which is a function of the signal representative of wheel motion, together with a switch which selectively applies the motor control signal to the motor in order to effect actuator desaturation only during the times that the switch is closed.

The switch can be controlled according to principles already known in the art either automatically by signals generated within the spacecraft or from the ground.

The signal modifying means can be a circuit device having a fixed gain, or can include, for example, a somewhat more complicated system, such as a cascade lag-lead compensator. However, at the present time, the advantage of such more complicated system is not apparent. In any event, because of the simple nature of the signal modifying means, it could be constructed in such manner that its gain can be varied under control of signals sent from the ground in order to adjust for differences between the estimated, or design, and the actual performance of the actuator.

BRIEF DESCRIPTION OF THE DRAWINGS

FIGS. 1 and 2 have already been described above.

DESCRIPTION OF THE PREFERRED EMBODIMENTS

Figure 1:
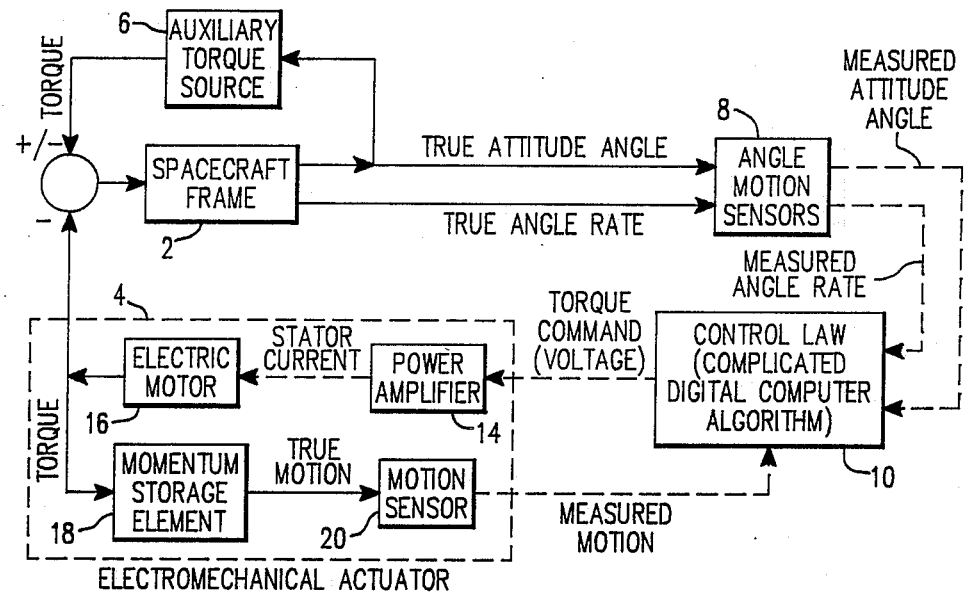
FIG. 1 is a circuit diagram of one known type of attitude control system, including one control channel.
Figure 3:
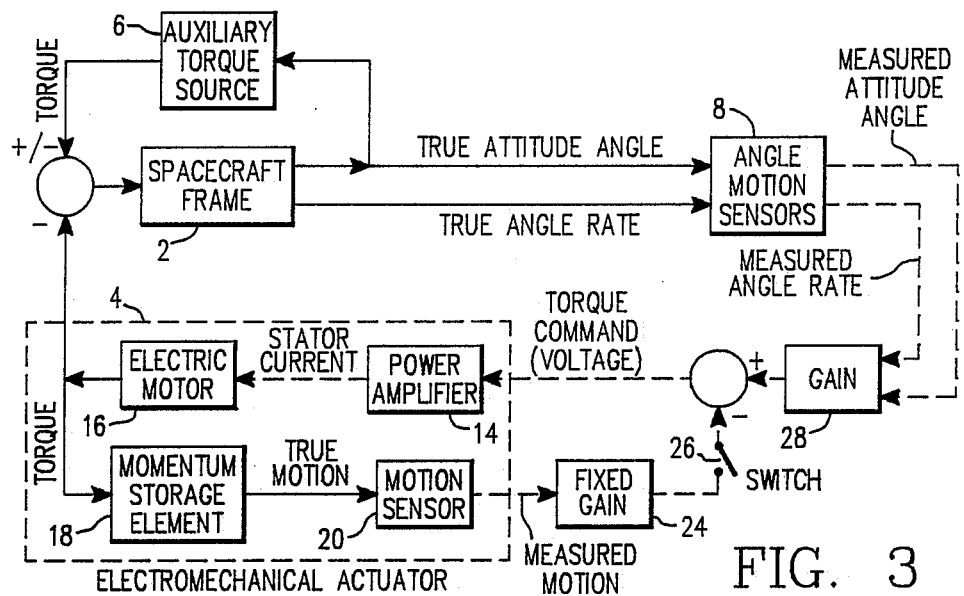
FIG. 3 is a diagram illustrating a system of the type shown in FIG. 1, modified in accordance with the present invention.

FIG. 3 illustrates a first type of system according to the present invention, which, as can be seen, differs from the arrangement as shown in FIG. 1 primarily with respect to the manner in which actuator desaturation is controlled.

According to the invention, desaturation is effected by conducting a measured element motion signal from sensor 20 to a device 24 having a selected gain, with the output of device 24 being conducted via a switch 26 and a node which applies a negated version of the signal provided by device 24 to power amplifier 14 in order to drive motor 16 in a direction which will dissipate the unwanted energy which has been stored in the actuator.

During normal operation of actuator 4, when that actuator is operating to maintain the attitude of frame 2 with respect to at least one attitude axis, switch 26 is open so that the output of device 24 does not contribute to the control operation. When desaturation is to be effected, switch 26 is closed, either by a signal generated under control of programming within the vehicle or by a ground control signal. Then, the motion measured by sensor 20 is converted by device 24 into a signal which is applied with the requisite polarity to drive motor 16 in a manner which will effect desaturation.

As in the case of known systems, desaturation should be performed when conditions are such that passive torque source 6 is producing a restoring torque since, during desaturation, actuator 4 will be applying a destabilizing, or disturbance, torque to frame 2.

Because of the nature of the components 18, 20 and 24 in the feedback path, this feedback path has a low pass characteristic. This means that even during desaturation, actuator 4 is capable of producing a stabilizing response to short duration disturbance impulses.

The embodiment shown in FIG. 3 further differs from the corresponding prior art arrangement of FIG. 1 by the provision of a stabilizing torque command signal generating device 28 having a comparatively simple gain characteristic. Device 28 derives a stabilizing torque command signal from an appropriate combination of the measured attitude angle and measured angle rate signals associated with the respective reference frame axis. Device 28 can be given relatively simple gain characteristic because the signal which it generates does not play a significant part in the desaturation operation. Depending on the characteristics of the particular attitude control system involved, the gain of device 28 could be constant, frequency dependent, or time variable. Preferably, the gains of devices 24 and 28 are selected so that all of the poles of all of the attitude control channels are in the left half of the complex frequency plane.

During desaturation, with switch 26 closed, the signal received by power amplifier 14 is proportional to the difference between the torque command voltage generated at the output of device 28 and the negative feedback voltage supplied by device 24, the gain of device 24 being selected to assure that whenever switch 26 is closed, the voltage received by amplifier 14 will have a polarity sufficient to effect the desaturation operation.

Embodiments of the type shown in FIG. 3 could be provided with auxiliary torque sources which are constructed such that when the spacecraft is in its desired attitude and actuators 4 are not being desaturated, the restoring torque generated by the auxiliary actuators is in equilibrium with disturbance torques acting on the spacecraft frame. In this manner, the control requirements imoposed on actuators 4 will be minimized. The auxiliary torque sources could be constructed to establish this relation on the basis of principles well known in the art.

Figure 2:
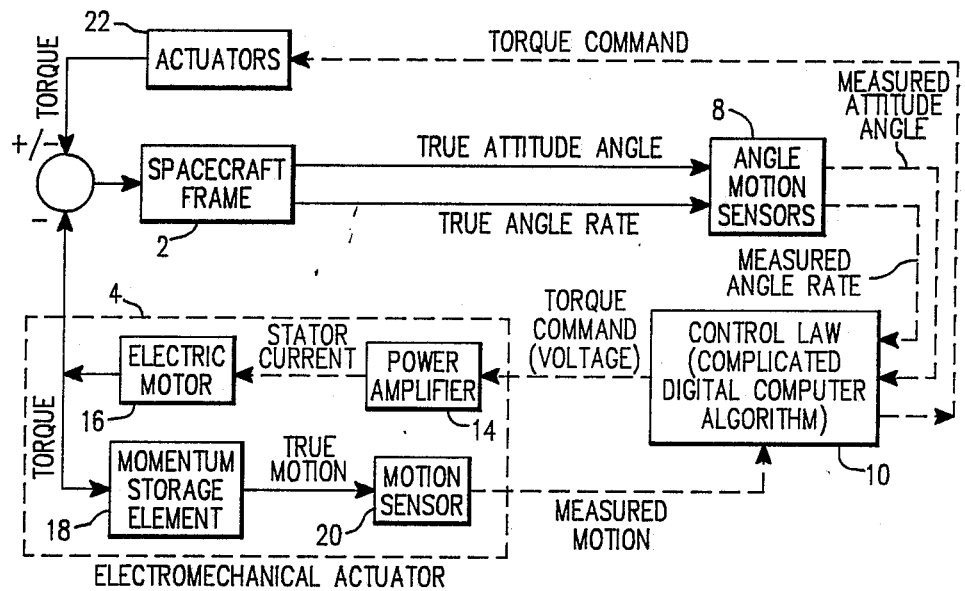
FIG. 2 is a diagram similar to that of FIG. 1 of a second known type of control system.
Figure 4:
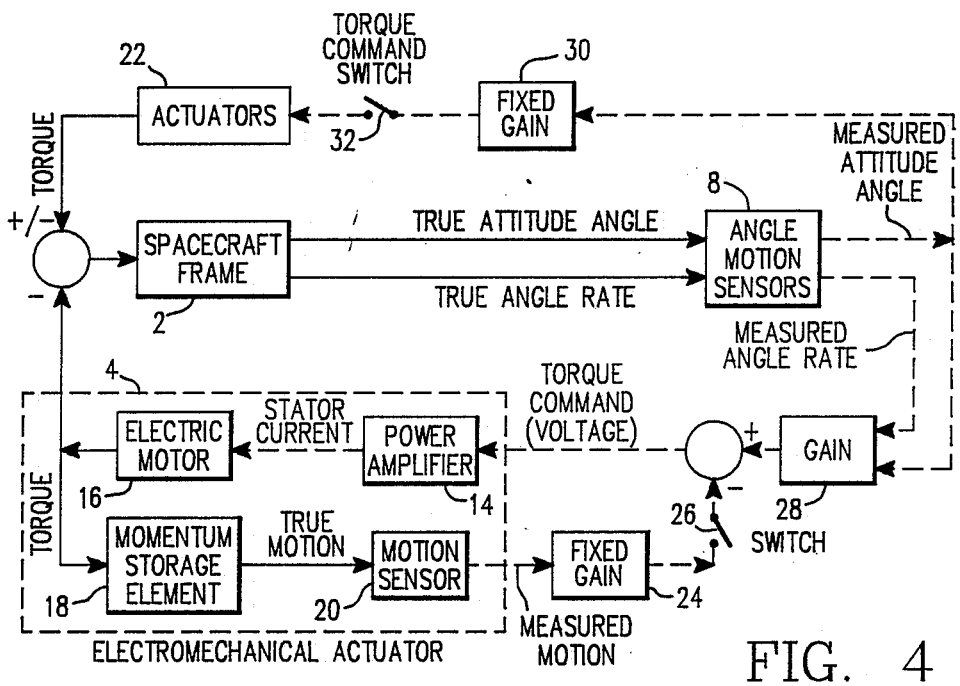
FIG. 4 is a diagram illustrating a system of the type shown in FIG. 2, modified in accordance with the present invention.

FIG. 4 illustrates an embodiment of the present invention in a system having the form shown in FIG. 2. The embodiment shown in FIG. 4 differs from that of FIG. 2 not only by the provision of devices 24 and 28 and switch 26, but additionally by the provision of a further signal generating device 30, preferably having a fixed gain, and a torque command switch 32 connected between device 30 and the actuator or actuators 22 associated with the particular attitude control channel. Since, in embodiments of this type, actuators 22 always produce a restoring torque, desaturation could be effected at any time. The actuators 22 receive torque commands proportional in magnitude to the measured deviation from the desired attitude angle based on the measured attitude angle signal conducted from sensors 8. Device 30 will create a suitable sign inversion to assure that the torque command signal which it produces has the polarity required to cause the associated actuators 22 to produce restoring torques. Device 30 could have any one of the gain characteristics described above with reference to device 28.

Since actuators 22 are placed in operation only during desaturation, the switches 26 and 32 of a given attitude control channel will be operated in synchronism, so that both switches are open or closed at the same time. In addition, these switches would be opened if the actuator or actuators 22 associated with a given channel should fail in a such a manner as to generate disturbance torques. If actuators 22 are gas jet thrusters, their operation only during desaturation procedures will serve to conserve the thruster fuel supply.

The desaturation technique characterizing the present invention is particularly advantageous when applied to earth-oriented satellites, when the gravity gradient of the earth is used to generate the required auxiliary restoring torques in the roll and pitch channels of the attitude control systems, and the inertial reaction to the rotation of the satellite around the earth is used to generate the required auxiliary restoring torque in the yaw channel. In order to accomplish this, constraints should be imposed on the mass distribution of the satellite. These are the same constraints as would have to be imposed to maintain attitude stability without active control.

In more general terms, desaturation can be achieved according to the present invention in any attitude control system other than one having the following combination of features: passive auxiliary restoring torque sources; control moment gyro actuators; and orientation of the spacecraft in inertial space.

During a desaturation procedure, there is a decrease in the accuracy with which the spacecraft attitude is being controlled. Therefore, it is preferable that desaturation be performed when some deviations in attitude can be tolerated.

If each actuator is associated with a given attitude axis, then the actuators associated with the various axes can be desaturated at different times. On the other hand, if attitude control about each axis is effected by the combined operation of several actuators, then all actuators should be desaturated simultaneously. For example, there are attitude control systems which employ four actuators each of which contributes to the attitude control which respect to several axes.

The present invention permits desaturation to be controlled by a relatively simple device having a fixed gain, i.e. a gain which is preferably independent of the signal supplied thereto, but which may, if desired, contain a lag-lead compensator. In any event, because of the relative simplicity of device 24, the invention permits the desaturation circuitry for new satellites to be designed with far less effort than required by the prior art approach. Moreover, device 24 can easily be implemented as a separate, relatively simple circuit unit and this leads to the possibility of constructing the unit so that its fixed gain can be varied by signals transmitted from the ground after the satellite has been placed into orbit. As a result, errors in initial design assumptions can be corrected after the satellite has been launched.

For this purpose, device 24 could be constituted by an analog circuit including an element such as a potentiometer whose slider can be shifted by a suitable motor in order to vary the gain. Alternatively, device 24 could be a digital device having an addressable memory composed of a plurality of columns each associated with a respective gain. Each column would contain a row of memory locations each having an address associated with a particular measured motion signal value and containing a representation of the output signal associated with that measured motion value. Then, in effect, the gain of the device would be determined by selection of an appropriate column by means of a signal sent from the ground. This digital technique is already well known in the art, per se.

Figure 5:
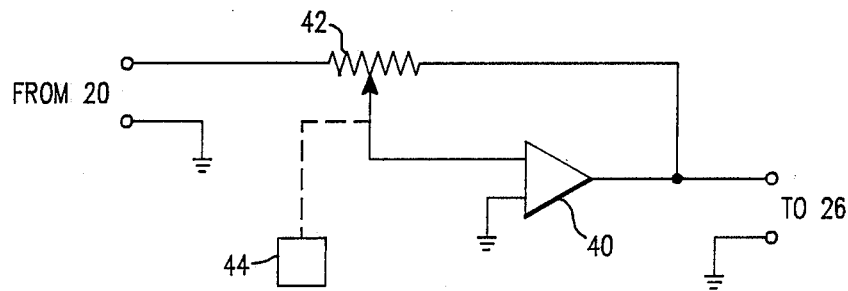
FIG. 5 is a diagram illustrating an analog embodiment of a fixed gain device which may be used in the attitude control systems of FIGS. 3 and 4.

FIG. 5 illustrates, in simplified form, an analog embodiment of device 24 in which the measured motion signal is applied to a differential amplifier 40 having a preset gain via a potentiometer 42 which is connected between the output of sensor 20 and the output of amplifier 40. The slider of potentiometer 42 is electrically connected to the negating input of amplifier 40 and mechanically coupled to a servo motor 44 which is driven in response to signals transmitted from a ground station in order to vary the gain of the circuit. The output of amplifier 40 is connected to switch 26.

Figure 6:
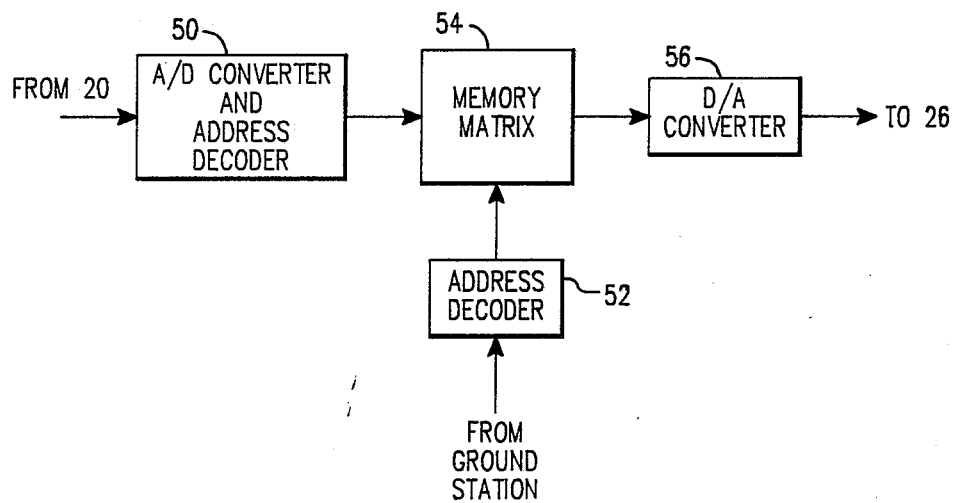
FIG. 6 is a diagram illustrating a digital embodiment of a fixed gain device which may be used in the attitude control systems of FIGS. 3 and 4.

A digital embodiment of device 24 is shown in FIG. 6 and includes an analog/digital converter and address decoder 50 which receives the measured motion signal and converts that signal into a memory row address representative of the amplitude of the measured motion signal. A second address decoder 52 generates a column address in response to a signal sent from a ground station. The resulting row and column address signals address a corresponding memory location in a memory matrix 54 and the value stored at that location, which is representative of the desaturation control signal to be produced, is supplied to a digital/analog converter 56 which then delivers a corresponding analog signal to switch 26.

Device 30 of FIG. 4 could also have the form shown in one of FIGS. 5 and 6.

While the description above shows particular embodiments of the present invention, it will be understood that many modifications may be made without departing from the spirit thereof. The appended claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. In an attitude control system for a spacecraft having a frame which is to be maintained in a desired orientation relative to a selected set of reference axes, which system includes an electromechanical actuator mechanically coupled to the spacecraft frame for applying to the frame a mechanical torque which opposes deviations from the desired orientation relative to at least one reference coordinate, the actuator including an electric motor and an element connected to be rotated by the motor, and torque command signal generating means connected to the motor for applying a torque command signal which is a function of such deviations and which drives the motor in a manner to control the torque being produced by the actuator, the improvement comprising energy desaturating means comprising: means coupled to said element for producing a signal representative of element motion; signal modifying means connected to produce a control signal having a magnitude which is a function of the signal representative of element motion, said signal modifying means comprising a signal amplifying device having a fixed gain; and signal coupling means including a switch connected for applying the control signal to said actuator with a polarity for effecting actuator desaturation only during the times that said switch is closed.

2. A system as defined in claim 1 further comprising auxiliary torque means for applying to the frame an auxiliary torque which opposes deviations from the desired orientation when said switch is closed.

3. A system as defined in claim 2 wherein said auxiliary torque means is constructed such that, when said energy desaturating means is inactive and the spacecraft is in its desired attitude, the restoring torque generated by said auxiliary means is in equilibrium with disturbance torques acting on the spacecraft frame.

4. A system as defined in claim 1 wherein said actuator comprises a reaction wheel assembly having a wheel which constitutes said element.

5. A system as defined in claim 1 wherein said actuator comprises a momentum wheel assembly having a wheel which constitutes said element.

6. A system as defined in claim 1 wherein said actuator comprises a control moment gyro having a rotor and a pivotally mounted gimbal supporting said rotor, and said gimbal constitutes said element.

7. In an attitude control system for a spacecraft having a frame which is to be maintained in a desired orientation relative to a selected set of reference axes, which system includes an electromechanical actuator mechanically coupled to the spacecraft frame for applying to the frame a mechanical torque which opposes deviations from the desired orientation relative to at least one reference coordinate, the actuator including an electric motor and an element connected to be rotated by the motor, and torque command signal generating means connected to the motor for applying a torque command signal which is a function of such deviations and which drives the motor in a manner to control the torque being produced by the actuator, the improvement comprising energy desaturating means comprising: means coupled to said element for producing a signal representative of element motion; signal modifying means connected to produce a control signal having a magnitude which is a function of the signal representative of element motion; signal coupling means including a switch connected for applying the control signal to said actuator with a polarity for effecting actuator desaturation only during the times that said switch is closed; and auxiliary torque means for applying to the frame an auxiliary torque which opposes deviations from the desired orientation when said switch is closed, said auxiliary torque means comprising at least one active component for generating the auxiliary torque, auxiliary torque generating means for generating an auxiliary torque command signal which is a function of such deviations, and second signal coupling means including a second switch connected for applying the auxiliary torque command signal to said active component only during the times that said second switch is closed.

8. A system as defined in claim 7 wherein said auxiliary signal generating means comprises an amplifying device having a fixed gain.

9. A system as defined in claim 7 wherein said switch and second switch are operated in unison.

10. In an attitude control system for a spacecraft having a frame which is to be maintained in a desired orientation relative to a selected set of reference axes, which system includes an electromechanical actuator mechanically coupled to the spacecraft frame for applying to the frame a mechanical torque which opposes deviations from the desired orientation relative to at least one reference coordinate, the actuator including an electric motor and an element connected to be rotated by the motor, and torque command signal generating means connected to the motor for applying a torque command signal which is a function of such deviations and which drives the motor in a manner to control the torque being produced by the actuator, the improvement comprising energy desaturating means comprising: means coupled to said element for producing a signal representative of element motion; signal modifying means connected to produce a control signal having a magnitude which is a function of the signal representative of element motion, said signal modifying means comprising a circuit arrangement which produces an adjustable amplitude relation between the signal representative of element motion and the control signal; and signal coupling means including a switch connected for applying the control signal to said actuator with a polarity for effecting actuator desaturation only during the times that said switch is closed.

11. A system as defined in claim 10 wherein said circuit arrangement comprises means responsive to a signal originating from outside the spacecraft for adjusting the amplitude relation.

12. A system as defined in claim 11 wherein: said circuit arrangement is analog circuit; said means responsive to a signal comprises a component having a variable impedance; and said component is connected such that the adjustable amplitude relation is a function of the value of the impedance and the impedance is varied by the signal originating from outside the spacecraft.

13. A system as defined in claim 12 wherein said component comprises a potentiometer and said circuit arrangement further comprises a motor connected to adjust said potentiometer in response to the signal originating from outside the spacecraft.

14. A system as defined in claim 11 wherein: said circuit arrangement is a digital circuit comprising: a memory having a plurality of groups of memory locations, each group being associated with a respective amplitude relation and storing a succession of representations of control signal values corresponding to respective values of the signal representative of wheel motion; and signal decoder means connected to said memory for deriving the control signal from representations stored in a respective group of memory locations.

15. A system as defined in claim 14 wherein said circuit arrangement further comprises means connected to said memory for selecting the group of memory locations from which the control signal is derived in dependence on the value of the signal originating from outside the spacecraft.

* * * * *